J. H. REYNERSON.
CULTIVATOR.
No. 75,647.  Patented Mar. 17, 1868.
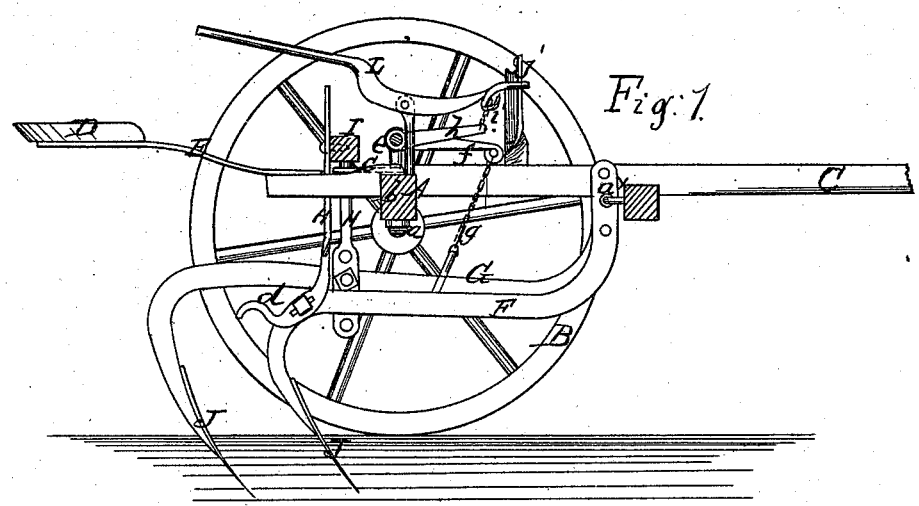
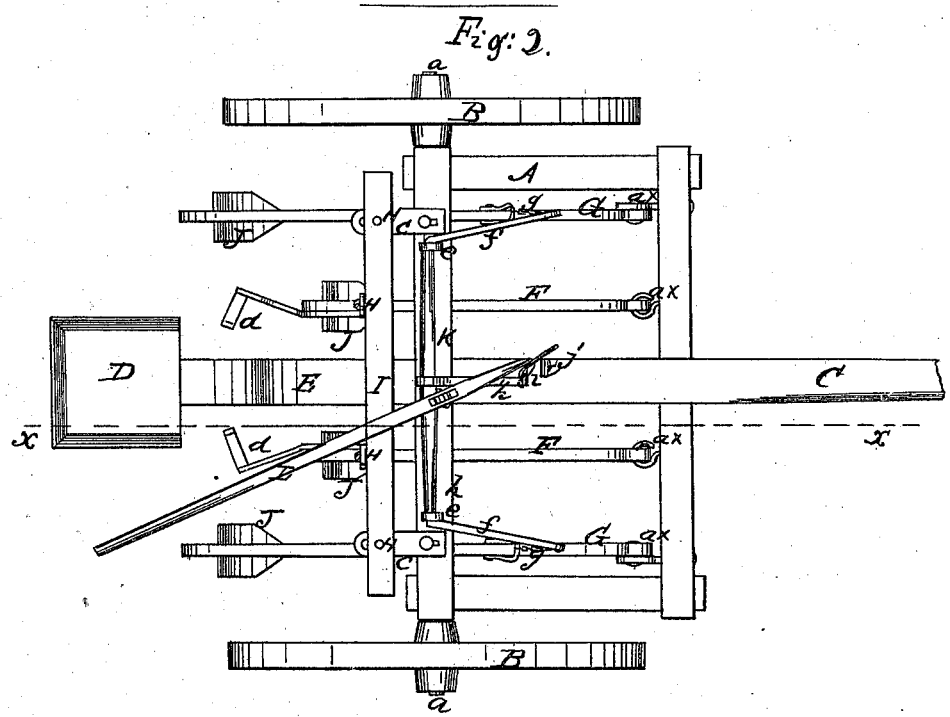

United States Patent Office.

J. H. REYNERSON, OF PLEASANT PLAINS, IOWA.

*Letters Patent No. 75,647, dated March 17, 1868.*

IMPROVEMENT IN CULTIVATORS.

The Schedule referred to in these Letters Patent and making part of the same.

TO ALL WHOM IT MAY CONCERN:

Be it known that I, J. H. REYNERSON, of Pleasant Plains, in the county of Decatur, and State of Iowa, have invented a new and improved Cultivator; and I do hereby declare that the following is a full, clear, and exact description thereof, which will enable those skilled in the art to make and use the same, reference being had to the accompanying drawings forming part of this specification.

This invention relates to a new and improved cultivator, of that class in which provision is made for adjusting or moving laterally the inner pair of shovels, for the purpose of enabling them to conform to the sinuosities of the rows of plants.

The invention consists in a peculiar construction and arrangement of the parts, as hereinafter fully shown and described, whereby the machine is put under the complete control of the driver or operator. In the accompanying sheet of drawings—

Figure 1 is a side sectional view of my invention, taken in the line $x\, x$, fig. 2.

Figure 2, a plan or top view of the same.

Similar letters of reference indicate corresponding parts.

A represents a rectangular frame, which is mounted on two wheels B B, and has a draught-pole, C, attached. The arms or spindles $a$, on which the wheels B are placed, are attached to the rear bar $b$ of the frame A, and the driver's seat D is secured to an elastic support, E, which is attached to the rear end of the draught-pole, and projects out from the rear end of the machine a sufficient distance to admit of the weight of the driver keeping the machine in an equipoised state. F represents the beams of the inner shovel or ploughs, and G G the beams of the two outer ones, the beams F being shorter than G, in order that the inner plough may be somewhat in advance of the outer ones. The front ends of all the beams are connected by joints to the front cross-piece of the frame A, said joints being formed of rivets, pins, or hooks passing through holes in the beams, several holes being made in each beam to admit of the front ends of the same being adjusted higher or lower, as desired, (see fig. 1.) The beams near their rear ends have each an upright bar, H, attached to them, and these bars are connected to a horizontal bar, I, at the rear of the frame A, the bars H of the outer beams, G, passing through guides $c$ secured to the rear of the frame A. The joints $a^\times$ of the inner beams, F, are formed in such a way as to admit of a lateral as well as a vertical movement of the former, while the joints of the outer beams G only require to admit of a vertical or up-and-down movement of the latter. The rear parts of all the beams are curved or bent downward to form standards, to which the shovels J are attached, and the two inner beams F have each a foot-bracket, $d$, attached, to admit of a lateral movement being given the two inner shovels by the feet of the driver.

By this arrangement the inner ploughs are made to conform to the sinuosities of the rows of plants without any trouble or difficulty whatever. On the top of the rear bar of the frame A there are bearings $e$, in which a shaft, K, is fitted, and allowed to turn freely. The ends of this shaft K are bent forward to form cranks $f\,f$, the ends of which are connected by chains $g$ to the outer beams G G, and to the centre of said shaft there is attached an arm, $h$, the outer end of which is connected by a link, $i$, to the front end of a lever, L, the fulcrum of which is on the rear part of frame A, the rear end of said lever L extending back within convenient reach of the driver on seat D. By depressing the rear end of this lever, all the beams may be raised simultaneously, and consequently all the shovels elevated above the surface of the ground and retained in an elevated state by catching the front end of the lever in a hook, $j$, on the plough-beam.

I claim as new, and desire to secure by Letters Patent—

1. The horizontal bar I, vertical bars H, rock-shaft K having arms $f$, arm $h$, lever L, and chain $g$, in combination with the plough-beams F, G, all arranged and operating as described, whereby the depression of the lever L raises the outer beams G, through the medium of the arms $h\,f$, and chain $g$, and the inner beams F, through the medium of the vertical bars H, and horizontal bar I, as and for the purpose herein set forth.

2. The vertical bars H, and horizontal bar I, in combination with the plough-beams F, G and lever L, as herein described, for the purpose specified.

3. The horizontal bars H, attached to the inner beams F, when the lower ends of said bars are provided with the projecting foot-rests $d$, arranged and operating as described, for the purpose specified.

J. H. REYNERSON.

Witnesses:
ELISHA HORN,
W. D. WILSON.